US012038698B2

(12) United States Patent
Zampell et al.

(10) Patent No.: US 12,038,698 B2
(45) Date of Patent: Jul. 16, 2024

(54) DEVELOPER UNIT SEALS WITH ENDCAPS HAVING CHANNELS

(71) Applicant: Hewlett-Packard Development Company, L.P., Spring, TX (US)

(72) Inventors: Jeffrey Zampell, San Diego, CA (US); John W. Godden, San Diego, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 126 days.

(21) Appl. No.: 17/911,213

(22) PCT Filed: Apr. 8, 2020

(86) PCT No.: PCT/US2020/027143

§ 371 (c)(1),
(2) Date: Sep. 13, 2022

(87) PCT Pub. No.: WO2021/206700

PCT Pub. Date: Oct. 14, 2021

(65) Prior Publication Data

US 2023/0094249 A1 Mar. 30, 2023

(51) Int. Cl.
*G03G 15/10* (2006.01)
*G03G 15/08* (2006.01)

(52) U.S. Cl.
CPC ..... *G03G 15/0817* (2013.01); *G03G 15/0898* (2013.01); *G03G 15/104* (2013.01); *G03G 2221/1657* (2013.01)

(58) Field of Classification Search
CPC ..................... G03G 15/0817; G03G 15/10–11
See application file for complete search history.

(56) References Cited

U.S. PATENT DOCUMENTS

| | | | | |
|---|---|---|---|---|
| 4,792,292 | A | 12/1988 | Gaenzle | |
| 5,577,421 | A * | 11/1996 | Kim | F16H 57/0471 74/606 R |
| 2009/0035037 | A1 | 2/2009 | Broch | |
| 2009/0214254 | A1 | 8/2009 | Jeon | |
| 2012/0075390 | A1 | 3/2012 | Park et al. | |
| 2016/0349668 | A1 | 12/2016 | Pingel et al. | |
| 2019/0346791 | A1* | 11/2019 | Sabo | G03G 15/10 |
| 2020/0064755 | A1* | 2/2020 | Sabo | G03G 15/10 |

FOREIGN PATENT DOCUMENTS

| | | | |
|---|---|---|---|
| DE | 202009013643 | U1 | 3/2011 |
| EP | 3539776 | A1 | 9/2019 |
| WO | 2018/141369 | A1 | 8/2018 |

* cited by examiner

*Primary Examiner* — Leon W Rhodes, Jr.
(74) *Attorney, Agent, or Firm* — Jordan IP Law, LLC

(57) ABSTRACT

In one example in accordance with the present disclosure, a developer unit seal is described. The developer unit seal includes an endcap. The endcap has an opening to receive a dynamic seal for a roller, an inlet to receive print fluid, and a channel embedded in a surface of the endcap. The channel connects the inlet with the opening to direct print fluid to the opening. The developer unit seal also includes a sealing member to cover the channel.

15 Claims, 8 Drawing Sheets

DEVELOPER UNIT SEALS WITH ENDCAPS HAVING CHANNELS

BACKGROUND

Developer units are used to supply a film of print fluid to a photoelectric imaging surface which then deposits the print fluid on a substrate such as paper. The print fluid supplied by the developer unit is pressurized and the developer unit may be sealed to prevent fluid leakage.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
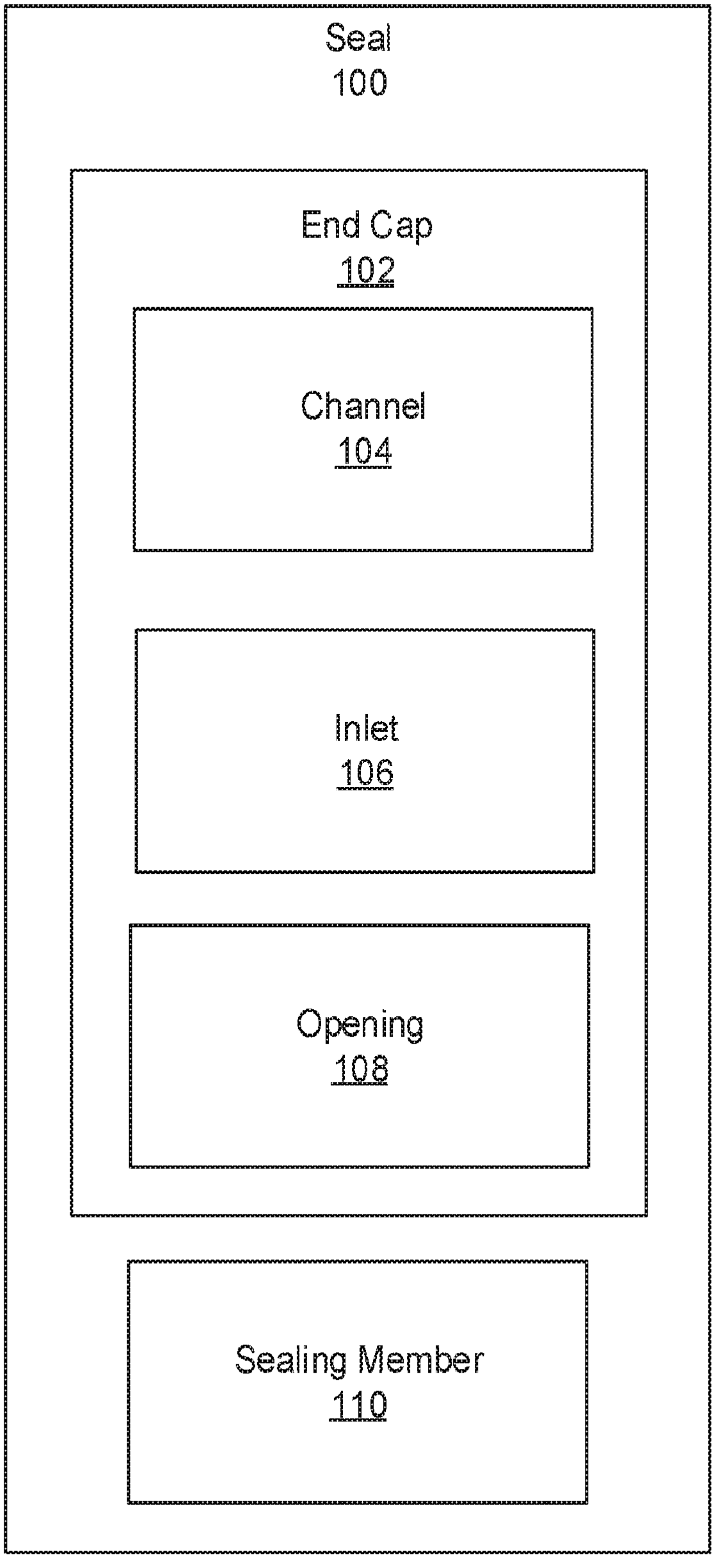
FIG. 1 is a block diagram of a developer unit seal with an endcap having a channel, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In liquid electrophotography, a photo conductive surface may be charged and selectively exposed with a laser to form a charge pattern that corresponds to an image to be printed on the substrate. In some examples, the photo conductive surface is a photo conductive drum. In other examples, the photo conductive surface is a belt or other mechanism. The photo conductive surface, or PIP, may contact a number of developer units such as binary ink developers (BID) that selectively transfer a print fluid pattern to the charge pattern to form a pattern on the PIP corresponding to an image to be printed. The patterns may then be transferred from the PIP to an intermediate member. The intermediate member may then transfer the print fluid pattern to the substrate. In examples, the intermediate member may be, or be imposed upon, a drum. In another example, the intermediate member may be, or be imposed upon, a belt, e.g., a continuous belt.

The developer unit may be a replaceable unit that receives print fluid from a reservoir and transfers the print fluid to the PIP. The developer unit may include a developer roller that imparts a thin film of print fluid to a charged surface of the PIP. Print fluid that is not transferred to the PIP may be cleaned from the developer roller and recycled by various components of the developer unit. Developer units provide an efficient mechanism to deliver print fluid to a PIP surface. However, certain characteristics of the developer unit may complicate its use.

For example, the developer unit may be an expensive component of the printing system and it is costly and ineffective to continually replace the developer units. When a developer unit fails prematurely and is replaced, it can result in customer dissatisfaction and additional expenditures.

One point of potential failure in a developer unit is the interface between the rotating and stationary components. Specifically, rollers on the developer unit receive fluid and are supported by a stationary endcap. Fluid from the rollers leaking into the endcap can reduce the developer unit life. In some examples, the developer unit life may be reduced to less than 10% of the expected life. Accordingly, a seal is formed between these components prevents print fluid from getting into the endcap. However, over time, the interface between the rotating component and stationary endcap may experience wear which can lead to the undesirable leakage into the endcap.

The wear may be exacerbated due to the higher process speeds of new developer units. These higher speeds create greater friction forces at this interface and thereby increase wear at this rotating/stationary interface. Wear and/or failure at this interface may be due to inadequate lubrication and cooling of the sealing surface. The lack of lubrication may lead to the seal at the interface forming grooves on the roller. Print fluid may pass through the formed grooves and into the endcap where the print fluid can either interfere with the operation of the developer unit and/or create a mess inside the developer unit, both of which are undesirable.

As used in the present specification and in the appended claims, the term "dynamic seal" refers to a component which impedes leakage past parts which are in relative motion. For example, the dynamic seal may seal an interface between a rotating roller and a stationary endcap of an ink developer unit. The dynamic seal may include a rib to press against a rotating shaft. In some examples, the dynamic seal is a rod seal and is exposed to movement on its inner diameter.

Accordingly, the present specification describes a seal that lubricates and cools this rotating/stationary interface to prevent the groove formation that can lead to leakage, performance reduction, and in some cases device failure. The present seal does so by introducing liquid at sealing surfaces. Accordingly, the present seal creates a pathway for print fluid to flow into and around the roller/end cap interface area, lubricating and cooling the sealing surfaces. This pathway is integrated into a seal, allowing the print fluid to be used as a coolant and lubricant before being returned for reuse in the developer unit. This lubrication and cooling effect prolong the lifespan of the developer unit by preventing leaks and abrasion at the roller/end cap interface.

Accordingly, the present specification describes a developer unit seal. The developer unit seal includes an endcap. The endcap has an opening to receive a dynamic seal for a roller, an inlet to receive print fluid, and a channel embedded in a surface of the endcap. The channel connects the inlet with the opening to direct print fluid to the opening. The developer unit seal also includes a sealing member which covers the channel.

The present specification also describes a developer unit. The developer unit includes a housing unit to house a fluid reservoir and a number of rollers. The developer unit also includes dynamic seals at each end of each roller. An endcap of the developer unit is removably coupled to each end of the housing unit to rotatably support the number of rollers. The developer unit also includes a number of enclosed channels at least partially formed in the endcap to direct fluid from the fluid reservoir to the dynamic seals to lubricate an interface between the dynamic seals and the rollers.

The present specification also describes a developer unit. The developer unit includes a housing unit to house a fluid reservoir and a plurality of rollers. Dynamic seals are at each end of each roller and an endcap is removably coupled to each end of the housing unit to rotatably support the plurality of rollers over the housing unit. The developer unit also includes a fluid directing system per endcap to direct fluid from the fluid reservoir to the dynamic seals. The fluid directing system includes a number of enclosed channels at least partially formed in each endcap. The number of enclosed channels to direct fluid from the dynamic seals and back to the fluid reservoir.

Such systems and methods 1) cool and lubricate the seal-roller interface in the developer unit; 2) reduce wear on developer unit rollers; 3) reduce developer unit leaks; and 4) prolong developer unit life.

FIG. 1 is a block diagram of a developer unit seal (100) with an endcap (102) with a channel (104), according to an example of the principles described herein. The developer unit seal (100) includes an endcap (102) which rotatably supports rollers of the developer unit. That is, during operation, the rollers rotate to draw fluid from a reservoir and deposit the fluid on a substrate. The endcap (102) holds these rollers in place relative to the reservoir and the substrate while allowing the rollers rotate during fluid deposition. Specifically, the endcap (102) includes an opening (108) to receive the rollers. In some examples, the opening (108) receives a dynamic seal which provides a fluidic seal while allowing the roller to rotate.

The endcap (102) includes a channel (104) which connects an inlet (106) with an opening (108). Portions of the channel (104) may be embedded in a surface of the endcap (102). In some examples, the channel (104) may have a top surface which is formed from the sealing member (110).

The endcap (102) also includes an inlet (106) which introduces fluid, which may be a print fluid such as ink, into the fluid delivery system. That is, in this example, print fluid is used to cool the stationary/rotation interface between the endcap (102) and/or dynamic seals and the rollers. Through the inlet this fluid is directed towards those openings (108).

As described above, the inlet (106) provides pressurized print fluid to the channel (104) which provides the print fluid to the opening (108) where the print fluid lubricates the interface between a dynamic seal and the roller. The inlet (106) may be formed in the sealing member (110). This may allow print fluid to move through the sealing member (110) and into the channel (104). In some examples, the inlet (106) may include a nozzle and/or similar element to direct the print fluid into the channel (104).

The opening (108) in the endcap (102) allows the roller to pass through a face of the endcap (102). The opening (108) contains a dynamic seal to seal the opening and prevent print fluid from getting into the mechanical portion of the endcap (102).

The sealing member (110) of the developer unit seal (100 provides a barrier between the print fluid and the endcap (102). The sealing member (110) may cover part of the opening (108) but also contains a hole which allows the roller to pass through the sealing member (110). In some examples, the sealing member (110) is a deformable foam. In other examples, the sealing member (110) may be a polymer layer. The sealing member (110) may be of uniform thickness or of variable thickness.

In an example, the sealing member (110) is molded to interface with the channel (104) of the endcap (102). For example, the sealing member may include features which interface with the endcap (102) to couple the components together. As a specific example, the sealing member (110) may snap into place on the endcap (102). In these examples, the sealing member (110) may include alignment features to align the sealing member (110) with the endcap (102).

The developer unit seal (100) includes a sealing member (110) which covers the channel (104) and provides a wall of the channel (104) to contain print fluid therein. That is, the channel (104) is partially formed in the endcap (102) and may have a surface formed by the sealing member (110).

During use, print fluid is provided at the inlet (106), flows through the channel (104), and to the opening (108). Then as described above, in the opening (108), the print fluid lubricates and cools a rotating interface between a dynamic seal and a roller. This cooling and lubrication serves to reduce abrasion of the roller by the seal. That is, without lubrication, the seal may abrade the roller. The abraded region allows print fluid to enter into the mechanical portion of the endcap (102) which may compromise the performance of the developer unit.

Figure 2:
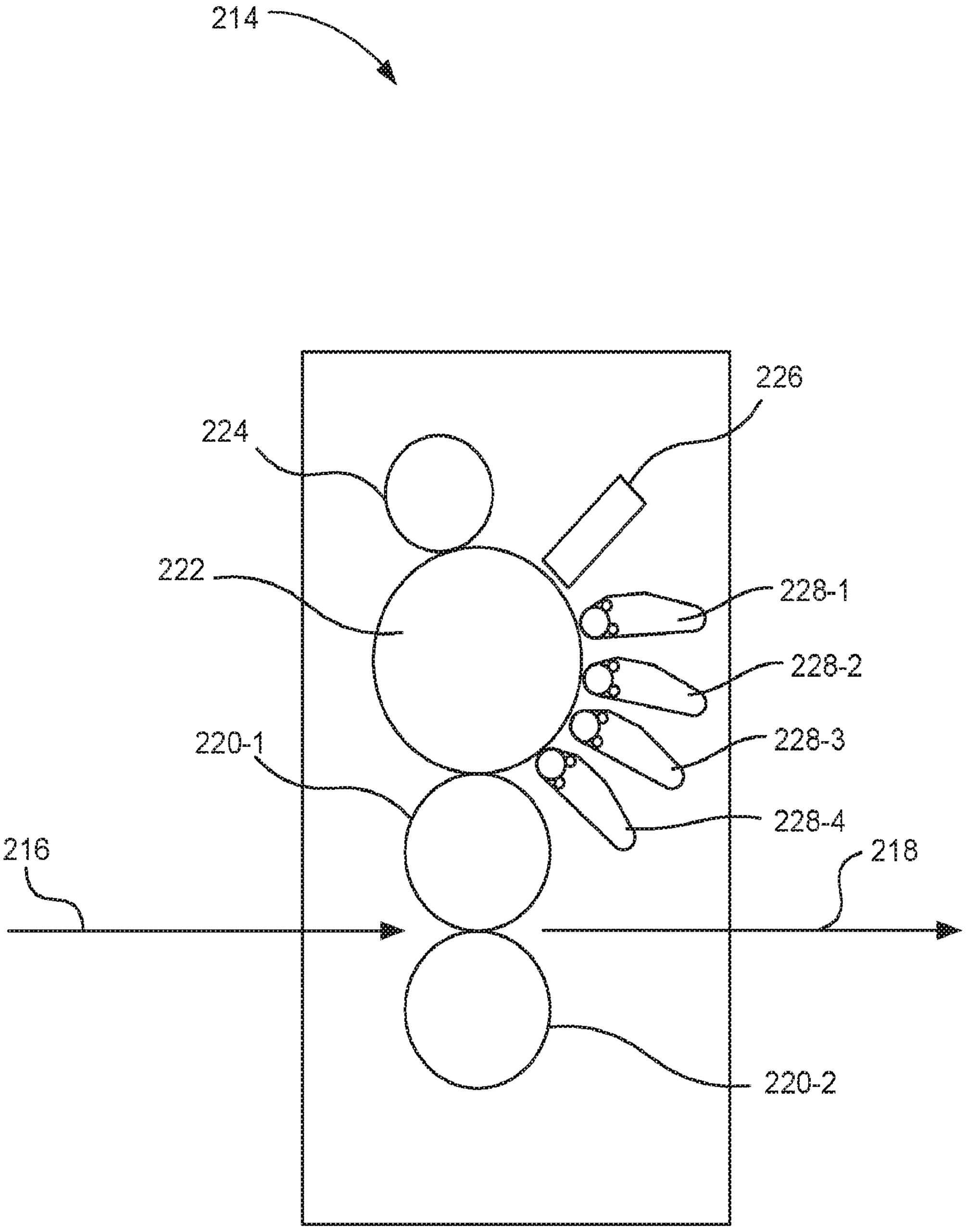
FIG. 2 is a diagram of a printing system with a developer unit that has endcaps with channels, according to an example of the principles described herein.

FIG. 2 is a diagram of a printing system (214) with a developer unit (228) that has an endcap (FIG. 1, 102) with a channel (FIG. 1, 104), according to an example of the principles described herein. As described above, the printing system (214) may be used to deposit print fluid on a substrate such as paper. The print fluid may be of a variety of types including ink. The print fluid may be deposited in a pattern such as text or graphics. The system (214) may receive a substrate in a direction indicated by the arrow (216). The system (214) may then deposit print fluid in a pattern on to the substrate. The substrate may then exit the printing system (214) with the corresponding print fluid printed thereon, in a direction indicated by the arrow (218).

More specifically, the printing system (214) may include a number of application rollers (220) to transfer a patterned print fluid to the substrate. For example, a top application roller (220-1) may include print fluid in a pattern that is to be transferred to the substrate. The substrate may be pinched between the top application roller (220-1) and a bottom application roller (220-2) to ensure an even and thorough distribution of print fluid on the substrate. The top application roller (220-1) may receive the patterned print fluid from a photoelectric imaging plate (PIP) drum (222) on which the pattern may be formed. While FIG. 2 depicts a PIP drum (222), other PIP surfaces may be used such as a belt, conveyor, or other component.

The outer surface of the PIP drum (222) may be charged uniformly by a charging roller (224). A writing head (226) may then selectively discharge portions of the PIP drum (222) to create a pattern that corresponds to the image or text to be printed on the substrate, allowing print fluid to transfer to these areas from a developer roller of the developer units (228).

A developer unit (228) may apply print fluid to the charged surfaces of the PIP drum (222) to form an image that is to be transferred to the top application roller (220-1). As will be described in more detail below, the developer unit (228) may include sealed channels (FIG. 1, 104) to cool and lubricate certain components of the developer units (228). As described above, the developer units (228) may be removably coupled to the PIP drum (222). While FIG. 2 depicts four developer units (2281, 228-2, 228-3, 228-4), which may provide different colors of print fluid, other numbers of developer units (228) may be implemented in accordance with the principles described herein.

Figure 3:
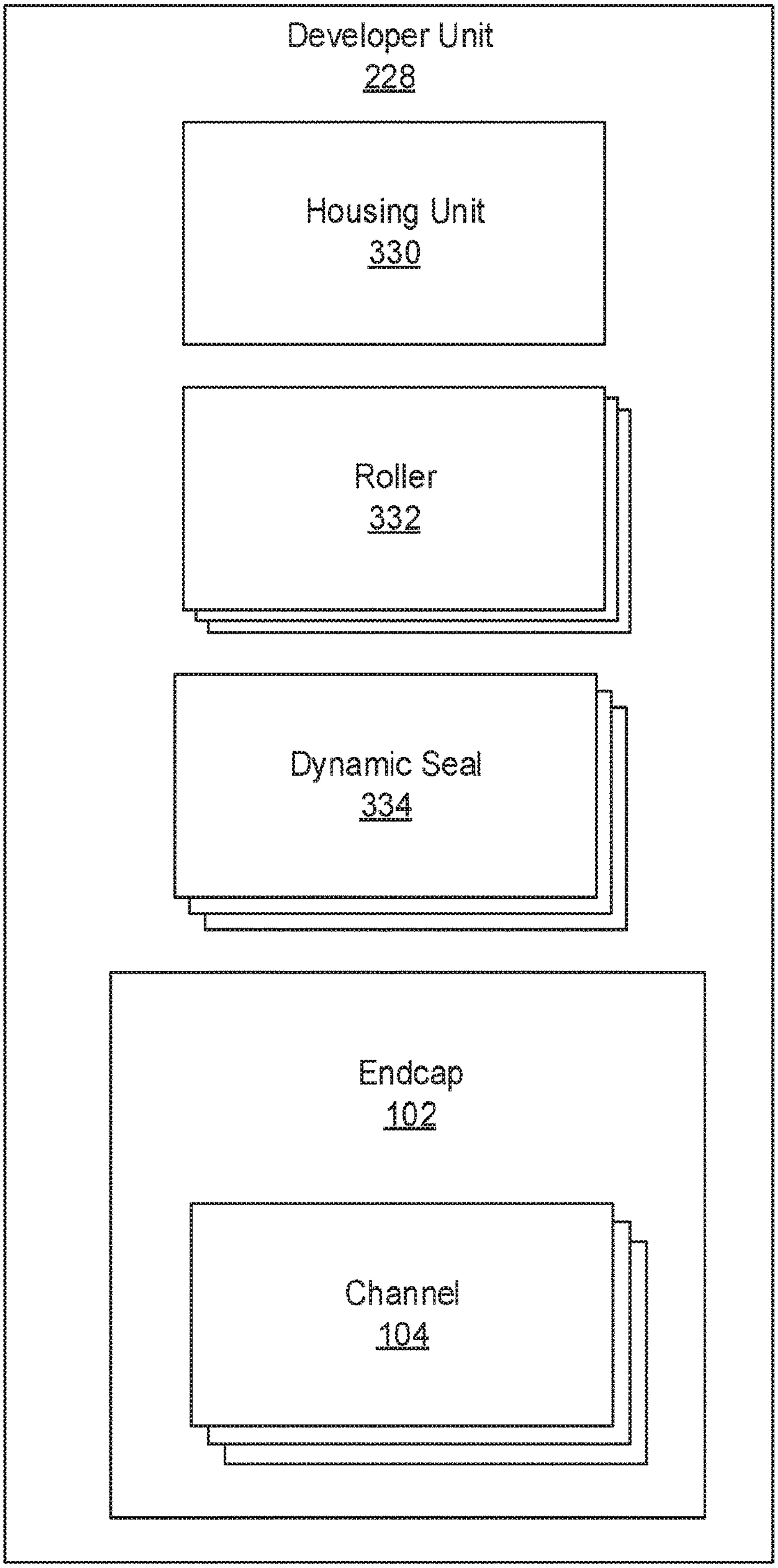
FIG. 3 is a block diagram of a developer unit that has endcaps with channels, according to an example of the principles described herein.

FIG. 3 is a block diagram of a developer unit (228) that has endcaps (102) with a channel (104), according to an example of the principles described herein. As described above, the developer unit (228) is a component of a printing system (FIG. 2, 214) that deposits print fluid of a particular type, i.e., a color, to a PIP surface, for example, a drum (FIG. 2, 222), in a particular pattern such that when multiple colors are deposited in respective patterns, an overall image and/or text is ultimately transferred to a substrate.

To achieve this functionality, each developer unit (228) includes various components. For example, each developer unit (228) includes a housing unit (330) to retain the print fluid, e.g., ink, to be deposited on the PIP surface. The developer unit (228) also includes a number of rollers (332) to facilitate the deposition process, and any subsequent process such as cleaning a developer roller of the developer unit (228). The rollers (332) are coupled to the developer unit (228) and allowed to rotate via endcaps (102) at either end of the housing unit (330). Specifically, each endcap (330) is removably coupled to each end of the housing unit (330), translates energy to drive the rollers (332), and rotatably supports the number of rollers (332) over the housing unit (330).

As the endcaps (102) do not rotate and the rollers (332) do, there is an interface where the rotating rollers (332) are coupled to the stationary endcap (102). This interface experiences friction between the relative surfaces. Dynamic seals (334) at ends of each roller (102) support the rollers (332) and prevent fluid from exiting the fluid reservoir. That is, fluid resides in a reservoir in the housing unit (330) and is provided to the rollers (332). However, it may be undesirable to allow this fluid to enter the portion of the endcaps (102) where mechanical mechanisms for rotating the rollers (332) reside. Accordingly, the dynamic seals (334) ensure that the print fluid remains in the reservoir and between the reservoirs/rollers (332) and does not enter into the mechanical portion of the endcap (102) where it can negatively impact operation of components found within the endcap (102).

However, as described above, these dynamic seals (334) may experience friction due to the motion of the rollers (332). If left unchecked, the friction and heat generated therefrom may negatively impact the operation of the developer unit (228). Specifically, the dynamic seals (334) may abrade the roller (332) shafts, creating a wear groove where fluid may enter the mechanical portion of the endcap (102), which is undesirable. Accordingly, the developer unit (228) includes a channel (104) per endcap (102) to direct fluid from the fluid reservoir to the dynamic seals (334) to cool them. That is, the fluid lubricates the interface between the dynamic seals (334) and the rollers (332) to prevent excess heat buildup that leads to developer unit (228) failure.

The sealing member (FIG. 1, 110) covers the channel (104) to form an enclosed channel (104). The enclosed channels (104) as described herein and as depicted in FIG. 3 form a fluid directing system that directs fluids from an inlet (FIG. 1, 106) to openings where dynamic seals (334) reside.

Figure 4:
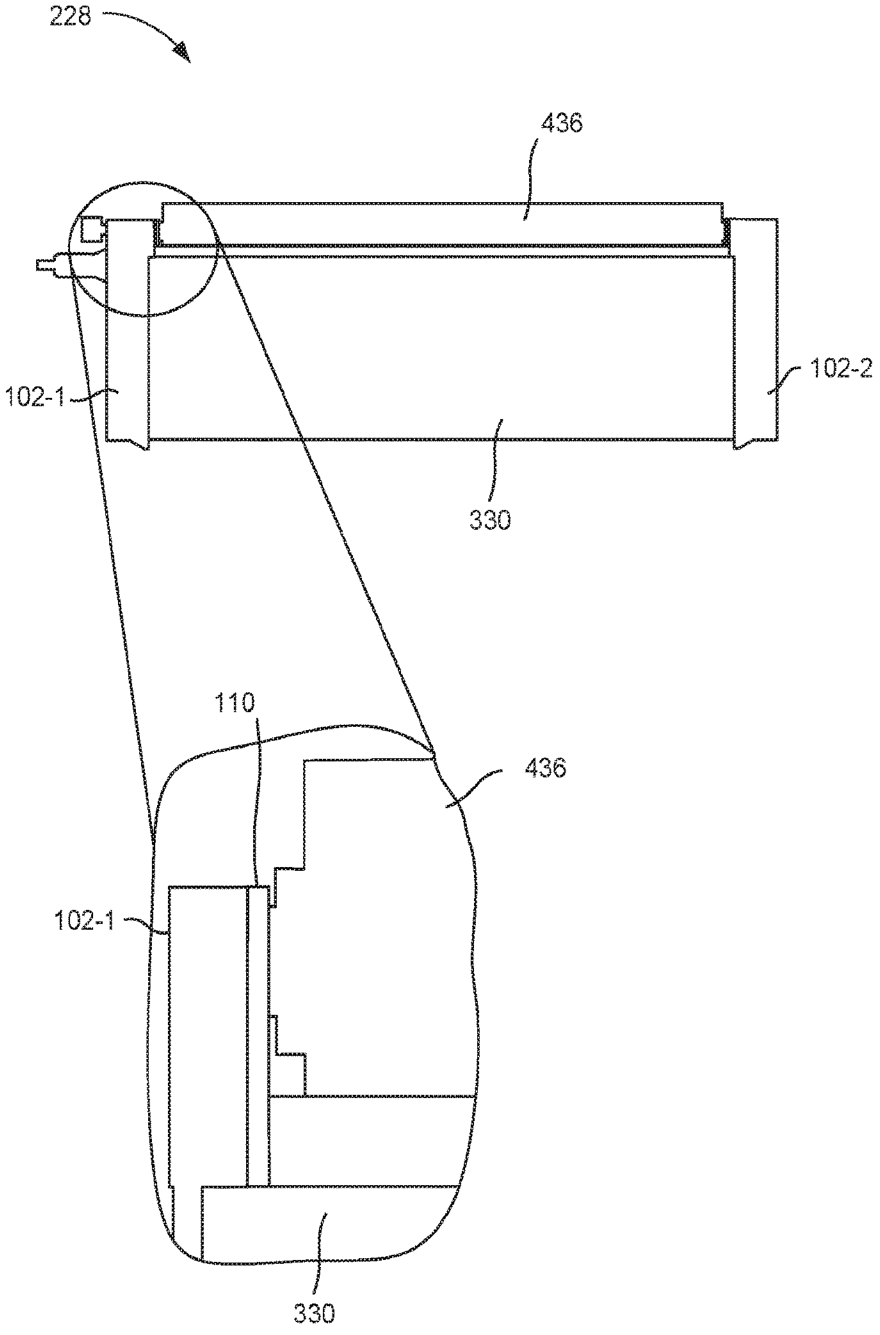
FIG. 4 is a diagram of a developer unit that has endcaps with channels, according to an example of the principles described herein.

FIG. 4 is a side view of a developer unit (228) that has endcaps (102) with a channel (FIG. 1, 104), according to an example of the principles described herein. FIG. 4 depicts the two endcaps (102-1, 102-2) that are disposed on either end of the housing unit (330) which supports a number of rollers (FIG. 3, 332). The number of rollers (FIG. 3, 332) may include a developer roller (436). The developer roller (436) may transfer a film of print fluid to a PIP surface of a printing system (FIG. 2, 214). For example, the developer roller (436) may receive charged and pressurized print fluid from a reservoir of the developer unit (228). The charged print fluid on the developer roller (436) may be attracted and transferred to the charged portions of the PIP surface that correspond to an image to be printed. The print fluid may be transferred to the substrate via the application rollers (FIG. 2, 220). The print fluid on the developer roller (436) may pass by a squeegee roller which regulates the thickness of the film on the developer roller (436). Due to the operation of the squeegee roller, a film of uniform thickness may be applied to the PIP surface.

As described above and as indicated in the zoomed-in portion of FIG. 4, the sealing member (110) may be placed between a developer roller (436) and a respective endcap (102). The sealing member (110) may form a seal between the endcap (102) and various rollers (332, 436).

Figure 5:
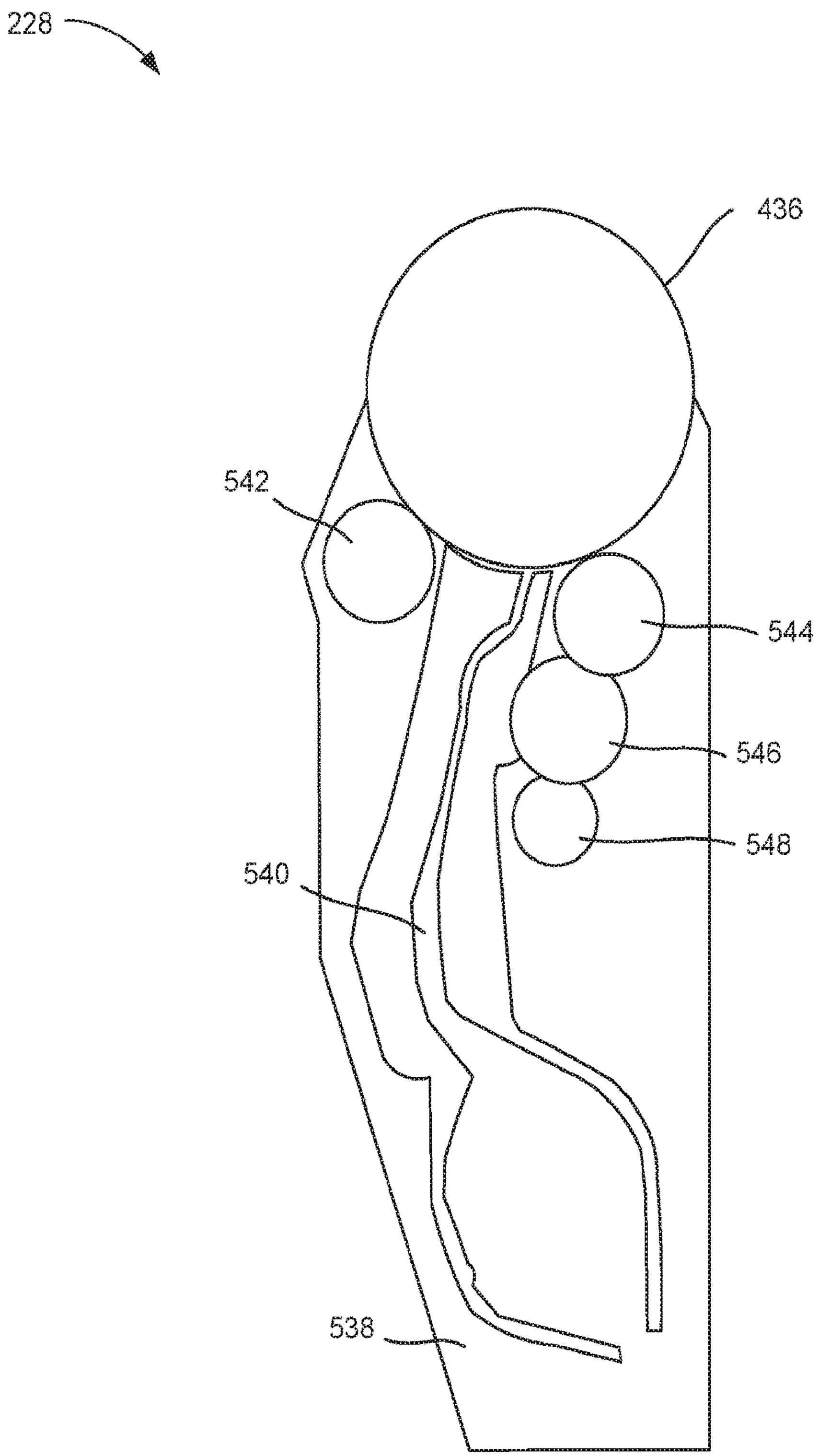
FIG. 5 is a cross sectional view of a developer unit that has endcaps with channels, according to an example of the principles described herein.

FIG. 5 is a cross sectional view of a developer unit (228) that has an endcap (FIG. 1, 102) with channels (FIG. 1, 104), according to an example of the principles described herein. Specifically, FIG. 5 depicts a cross-section of the housing unit (FIG. 3, 330) with the endcap (FIG. 1, 102) and sealing member (FIG. 1, 110) omitted for clarity.

In FIG. 5, the developer roller (436) body may extend into the page. The print fluid may reside in a reservoir (538) of the developer unit (228). In one particular example, the print fluid passes through an opening (540) to the developer roller (436) where it may be transferred to the PIP drum (FIG. 2, 222). Excess print fluid may flow down into the reservoir (538) where it may remix with bulk print fluid. As described above, the oppositely charged print fluid may be attracted to, and be transferred to, the developer roller (436). As described above, the developer unit (228) may include a number of other rollers (FIG. 3, 332) to aid in print fluid delivery. Specifically, a squeegee roller (542) may regulate the film thickness on the developer roller (436). The developer roller (436) may then transfer the film to the PIP drum (FIG. 2, 222). Excess print fluid that is not transferred to the PIP drum (FIG. 2, 222) may be cleaned off the developer roller (436) by the cleaner roller (544). A sponge roller (546) may then absorb print fluid from the cleaner roller (544). A squeezer roller (548) may squeeze the excess print fluid out of the foam sponge roller (546). The cleaner roller (544), sponge roller (546), and squeezer roller (548) allow the print fluid to be recycled and also reduce the buildup of sludge within the developer unit (228). While FIG. 5 depicts a particular configuration of rollers (FIG. 3, 332), other configurations may exist as well with any number of different rollers.

Figure 6:
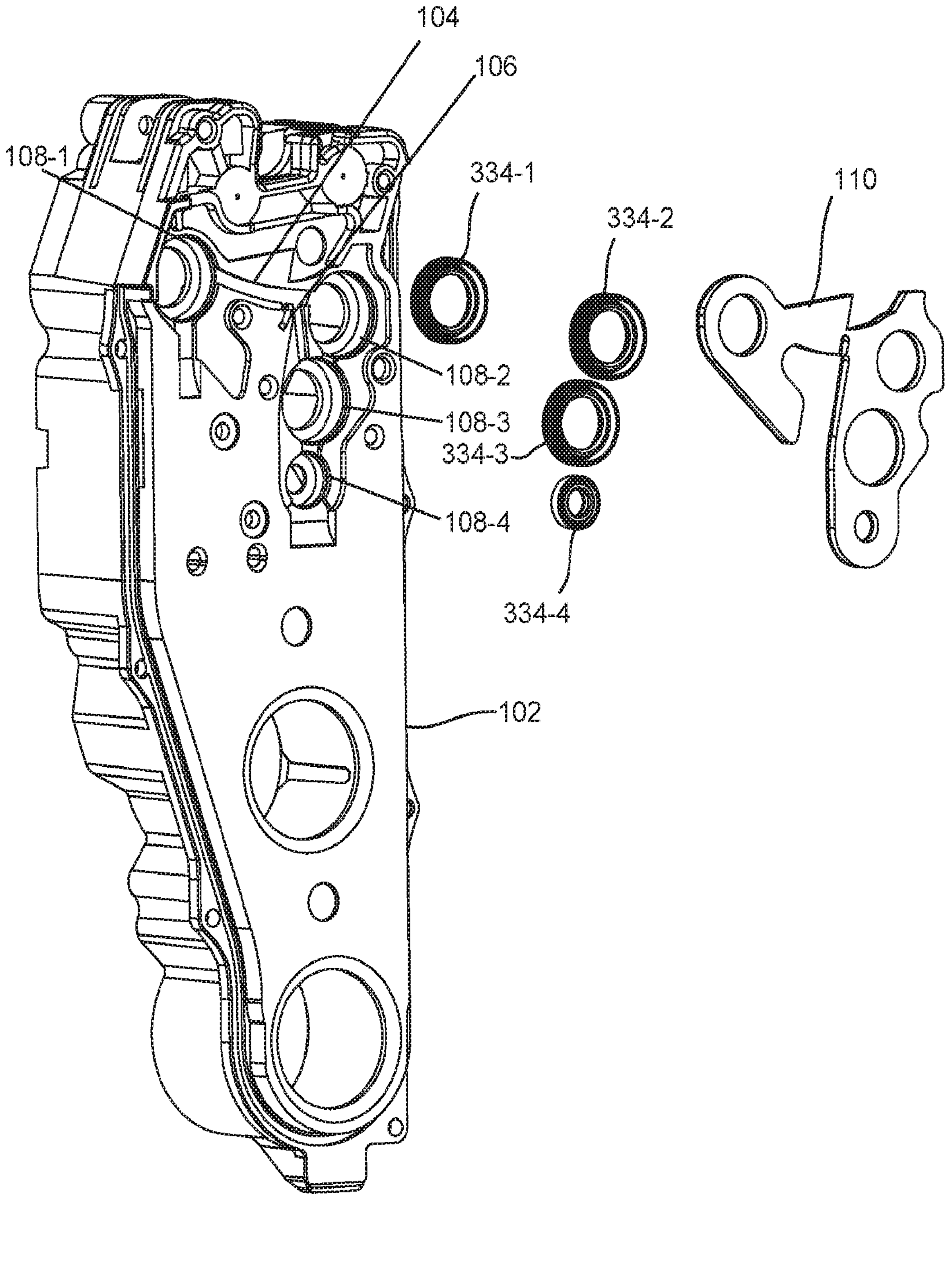
FIG. 6 is an exploded view of a developer unit endcap with channels, according to an example of the principles described herein.

FIG. 6 is an exploded view of a developer unit endcap (102) with channels (104), according to an example of the principles described herein. FIG. 6 clearly depicts the endcap (102) and the dynamic seals (334) that are to surround various rollers (FIG. 3, 332) of the developer unit (FIG. 2, 228). While FIG. 6 depicts four dynamic seals (334-1, 334-2, 334-3, 334-4) for four rollers (FIG. 3, 332), the endcap (102) may include any number of dynamic seals (334) for any number of rollers (FIG. 3, 332). In this particular example, four rollers (FIG. 3, 332) of the developer unit (FIG. 2, 228) are sealed by the dynamic seals (334). Given that each developer unit (FIG. 2, 228) includes two endcaps (102), a developer unit (FIG. 2, 228) implementing the sealing member (110) depicted in FIG. 6 would include eight dynamic seals (334).

FIG. 6 also depicts the endcap (102) and the sealing member (110). FIG. 6 also clearly depicts ports in the sealing member (110) that align with the rollers (FIG. 3, 332) that are to protrude into the endcap (102).

FIG. 6 also clearly depicts the openings (108-1, 108-2, 108-3, 108-4). That is, in some examples, the endcap (102) includes multiple openings (108-1, 108-2, 108-3, 108-4), each to receive a dynamic seal (334) for a roller (FIG. 3, 332). As described above, the channel (104) directs print fluid to each opening (108).

In some examples, the openings (108) are formed in a recessed pocket. That is, the endcap (102) may include a recessed pocket to receive the sealing member (110). This recessed pocket may also receive the dynamic seals (334) and the rollers passing through the respective openings (108).

FIG. 6 also clearly depicts the channel (104) to provide print fluid to the openings (108) containing dynamic seals (334). As depicted in FIG. 6, three surfaces of the channels (104) may be formed in the endcap (102) and a fourth surface formed in the sealing member (110) which is to contact the endcap (102).

As described above, if improperly lubricated, a dynamic seal (334) between rollers (FIG. 3, 332) of a developer unit (FIG. 2, 228) and the support structure for the rollers (FIG. 3, 332) may fail. This failure impacts performance of the developer unit (FIG. 2, 228) as a whole. Accordingly, the endcap (102) prevents such failure by providing print fluid, through a channel (104), to the openings (108) containing the dynamic seals (334). The print fluid serves as a coolant and lubricates the interface. This prolongs the life of the rollers (FIG. 3, 332) of the developer unit (FIG. 2, 228) and of the developer unit (FIG. 2, 228) as a whole.

In some examples, the channel (104) may have a square cross-section. In other examples, the channel (104) may have a U-shaped, oval, or circular cross-section. In some examples, the channel (104) may be a single channel (104). However, in other example, such as that depicted in FIG. 6, the channel (104) may include a manifold to provide print fluid to multiple dynamic seals (334) in multiple openings (108).

Figure 7:
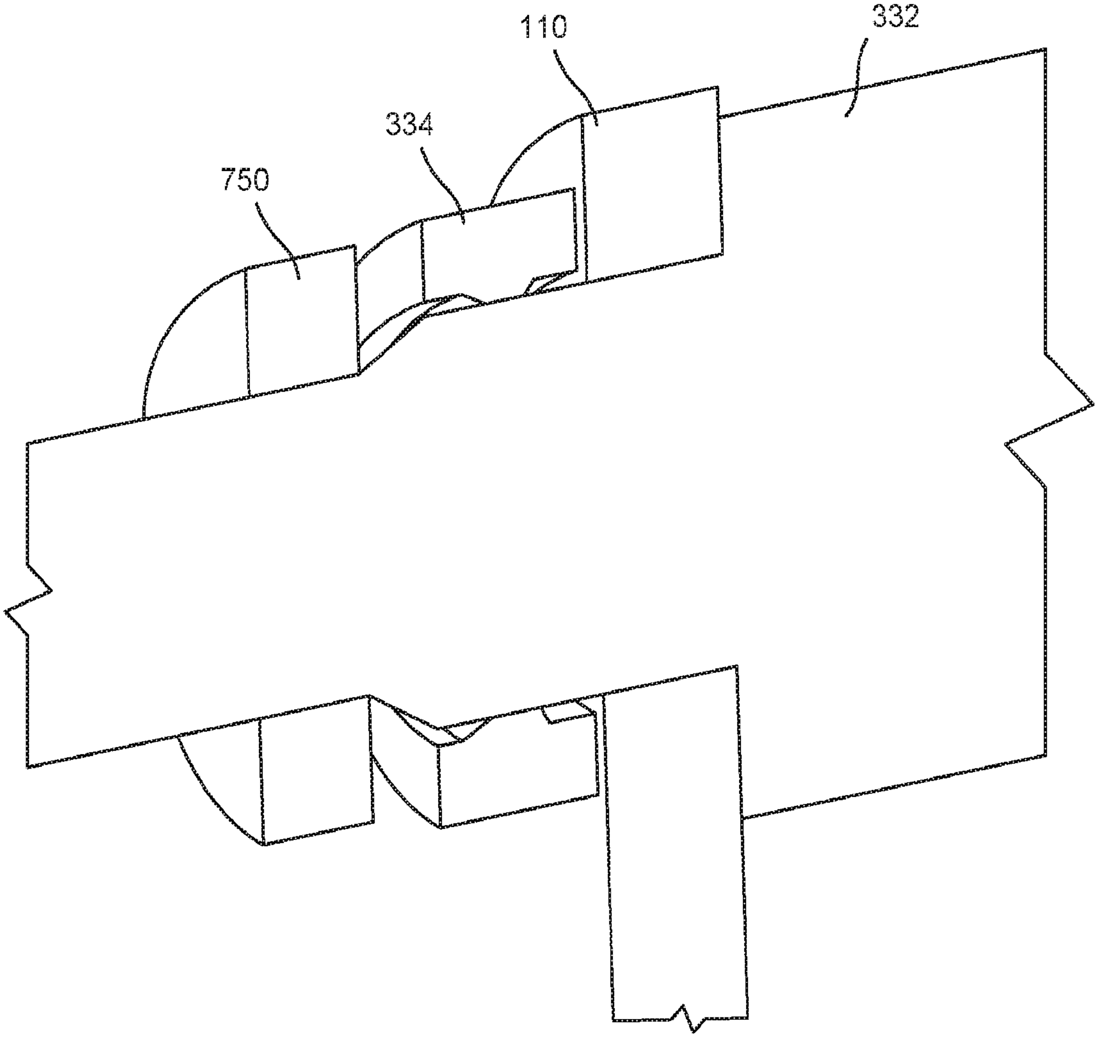
FIG. 7 is a cross sectional view of a portion of a developer unit that has endcaps with channels, according to an example of the principles described herein.

FIG. 7 is a cross sectional view of a portion of a developer unit (FIG. 2, 228) that has an endcap (FIG. 1, 102) with channels (FIG. 1, 104), according to an example of the principles described herein. Specifically, FIG. 7 depicts a roller (332) as it is rotatably supported by a bearing (750), which bearing (750) may be disposed in an endcap (FIG. 3, 102). As described above, the dynamic seal (334) via an interface with the roller (332) prevents fluid from entering the endcap (FIG. 3, 104) and interfering with the operation of components therein such as the bearing (750) and others. For example, the print fluid may contaminate the bearing (750), affecting its ability to rotatably support any associated roller (332). A faulty bearing (750) may impact the performance of the associated roller (332), thereby affecting the associated developer unit (FIG. 2, 220) from performing its intended operation to a satisfactory level. Specifically, faulty bearings (750) may cause print quality issues and lead to an overall expected failure much earlier than anticipated.

Moreover as described above, if improperly lubricated, the contact point between the dynamic seal (334), which may be a polyurethane material, and the roller (332), which may be a metallic material, may result in accelerated wear of the roller (332) such that a tight seal is not formed between these two components. Deterioration of this interface provides an entry point into the endcap (FIG. 3, 102) of unwanted fluid. Accordingly, the endcap (FIG. 1, 102) which includes channels (FIG. 1, 104) provides print fluid to the dynamic seal (334). This print fluid lubricates and cools the interface reducing the wearing down of the roller (332), reducing the likelihood of print fluid entry into the endcap (102).

In one example, the lifetime of the system was increased to 2.5× the expected life using the described approach. For example, a developer unit with an expected 2 million cycle lifetime was fitted with the endcaps (102) with channels (104), ran to over 5 million cycles. Accordingly, the described method and apparatus appears to significantly extend lifetime of the developer unit (228) by reducing wear on the roller shaft compared with an unlubricated roller shafts-dynamic seal interfaces. A second test design ran for 3.2 million cycles before experiencing a different failure mode unrelated to the bearings. The roller shafts showed much reduced wear compared with the unlubricated controls.

Figure 8:
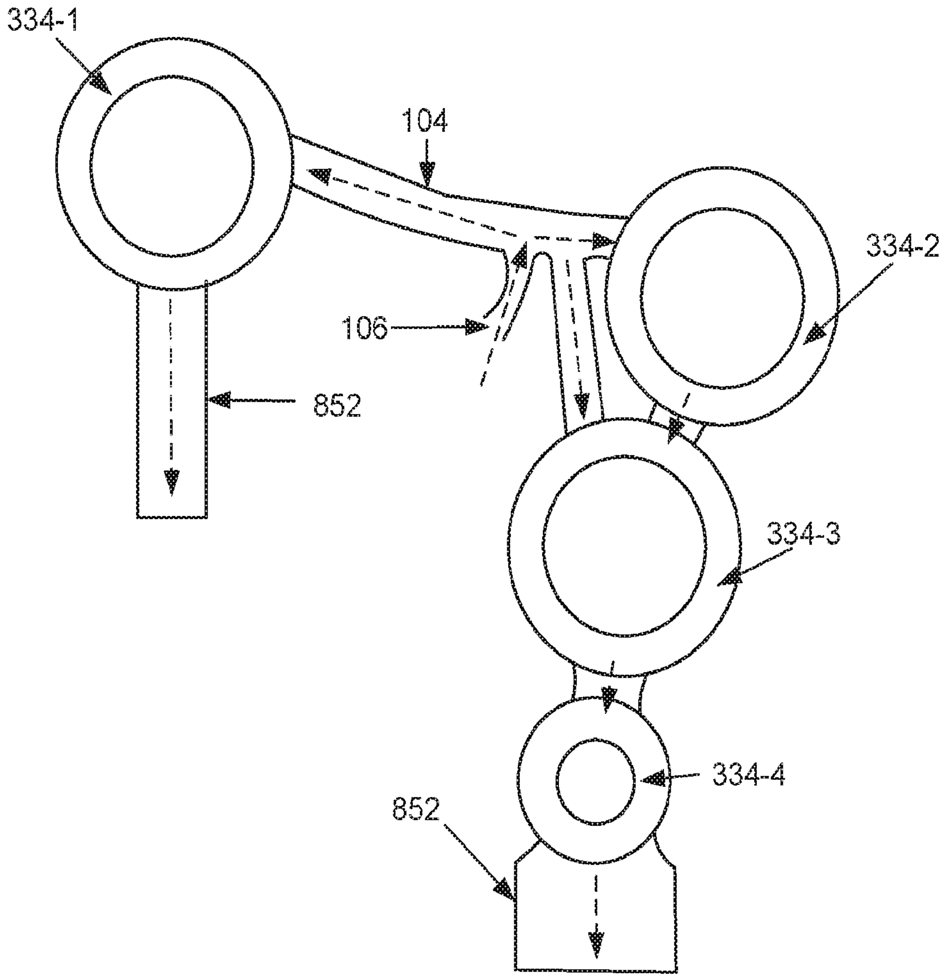
FIG. 8 is an end view of a fluid delivery system of a developer unit, according to an example of the principles described herein.

FIG. 8 is an end view of a fluid delivery system of a developer unit (FIG. 2, 228). That is, in some examples, the developer unit (FIG. 2, 228) includes a fluid directing system per endcap (102). This fluid delivery system directs fluid from a reservoir (FIG. 5, 538) to the dynamic seals (334) to lubricate an interface between the dynamic seals (334) and the corresponding rollers (FIG. 3, 332). This fluid delivery system may take many forms. For example, the fluid delivery system may include the endcap (102) with channels (104) formed therein. Specifically, FIG. 8 depicts the endcap (FIG. 1, 102) with the dynamic seals (334-1, 334-2, 334-3, 334-4) in place. For simplicity in FIG. 8, the sealing member (FIG. 1, 110) is omitted from view so as to depict the channels (104) and flow path of the print fluid through the channels (104) in the endcap (FIG. 1, 102).

The dashed arrows show the flow of print fluid through the fluid delivery system. Specifically, print fluid is provided at the inlet (106) and flows through the channel (104) to the openings (FIG. 1, 108) which contain the dynamic seals (334). The print fluid cools and lubricates the interface between the dynamic seals (334) and the rollers (FIG. 3, 332). The print fluid then exits the fluid delivery system through outlets (852) and flows back to the reservoir (FIG. 5, 538) for reuse. While FIG. 8 shows one example consistent with these principles, other examples may be implemented depending on the positions and number of rollers (FIG. 3, 332) in the system.

FIG. 8 also depicts the manifold fluid delivery system where secondary channels connecting openings (FIG. 1, 108). For example, the print fluid may first pass by and cool a first dynamic seal (334) then pass by and cool a second dynamic seal (334). Put another way, an outlet of one opening (FIG. 1, 108) feeds the print fluid to a second dynamic seal (334) before returning the print fluid to the reservoir (FIG. 5, 538). FIG. 8 also clearly depicts an outlet which allows print fluid to leave the region of the dynamic seal (334) and be collected in a reservoir (FIG. 5, 538) for reuse.

Such systems and methods 1) cool and lubricate the seal-roller interface in the developer unit; 2) reduce wear on developer unit rollers; 3) reduce developer unit leaks; and 4) prolong developer unit life.

What is claimed is:

1. A developer unit seal comprising:
an endcap comprising:
an opening to receive a dynamic seal for a roller,
an inlet to receive print fluid, and
a channel embedded in a surface of the endcap, the channel connecting the inlet with the opening to direct print fluid to the opening; and
a sealing member to cover the channel.

2. The seal of claim 1, further comprising a recessed pocket in the endcap to receive a dynamic seal.

3. The seal of claim 1, wherein the inlet is formed in the sealing member.

4. The seal of claim 1, wherein the sealing member is a deformable foam.

5. The seal of claim 1, wherein:
the endcap comprises multiple openings, each to receive a dynamic seal for a roller; and
the channel directs print fluid to each opening.

6. The seal of claim 5, wherein the print fluid flows from a first opening to a second opening.

7. The seal of claim 1, further comprising an outlet channel fluidically connected to the channel to provide the print fluid to a reservoir.

8. A developer unit comprising:
a housing unit to house a fluid reservoir;
a number of rollers;
dynamic seals at each end of each roller;
an endcap removably coupled to each end of the housing unit to rotatably support the number of rollers; and
a number of enclosed channels at least partially formed in the endcap to direct fluid from the fluid reservoir to the dynamic seals to lubricate an interface between the dynamic seals and the rollers.

9. The developer unit of claim 8, wherein the enclosed channel comprises:
three surfaces formed in the endcap; and
a fourth surface formed in a sealing member which is to contact the endcap.

10. The developer unit of claim 9, wherein the sealing member comprises ports to align with rollers that are to protrude into the endcap.

11. The developer unit of claim 8, wherein the number of channels direct fluid to multiple dynamic seals.

12. The developer unit of claim 8, wherein the number of channels comprises:
an inlet channel to receive fluid from the fluid reservoir; and
multiple outlet channels to return the fluid to the fluid reservoir.

13. A developer unit comprising:
a housing unit to house a fluid reservoir;
a plurality of rollers;
dynamic seals at each end of each roller; and
an endcap removably coupled to each end of the housing unit to rotatably support the plurality of rollers over the housing unit; and
a fluid directing system per endcap to direct fluid from the fluid reservoir to the dynamic seals, wherein the fluid directing system comprises a number of enclosed channels at least partially formed in the endcap, the number of enclosed channels to direct fluid from the dynamic seals and back to the fluid reservoir.

14. The developer unit of claim 13, wherein the channel comprises multiple paths to deliver print fluid to the dynamic seals.

15. The developer unit of claim 14, wherein at least one path delivers print fluid to multiple dynamic seals.

* * * * *